US012492311B2

(12) United States Patent
Zhang (10) Patent No.: US 12,492,311 B2
(45) Date of Patent: Dec. 9, 2025

(54) HYBRID SOL-GEL COATING FORMULATIONS DOPED WITH CORROSION INHIBITIVE PIGMENTS

(71) Applicant: Raytheon Company, Waltham, MA (US)

(72) Inventor: Weilong Zhang, Glastonbury, CT (US)

(73) Assignee: RAYTHEON COMPANY, Waltham, MA (US)

( * ) Notice: Subject to any disclaimer, the term of this patent is extended or adjusted under 35 U.S.C. 154(b) by 706 days.

(21) Appl. No.: 17/822,293

(22) Filed: Aug. 25, 2022

(65) Prior Publication Data

US 2023/0070903 A1    Mar. 9, 2023

Related U.S. Application Data

(60) Provisional application No. 63/239,494, filed on Sep. 1, 2021, provisional application No. 63/239,485, filed on Sep. 1, 2021.

(51) Int. Cl.
*C09D 5/08* (2006.01)
*C08G 77/58* (2006.01)
*C09D 183/14* (2006.01)

(52) U.S. Cl.
CPC ............ *C09D 5/084* (2013.01); *C08G 77/58* (2013.01); *C09D 5/086* (2013.01); *C09D 183/14* (2013.01)

(58) Field of Classification Search
None
See application file for complete search history.

(56) References Cited

U.S. PATENT DOCUMENTS

| | | | |
|---|---|---|---|
| 6,579,472 B2 | 6/2003 | Chung et al. | |
| 2003/0024432 A1* | 2/2003 | Chung | C09D 5/08 106/14.12 |
| 2010/0330380 A1 | 12/2010 | Colreavy et al. | |
| 2012/0298923 A1 | 11/2012 | Lee et al. | |
| 2014/0255611 A1 | 9/2014 | Ansart et al. | |
| 2016/0145443 A1* | 5/2016 | Kinlen | C09D 7/65 427/388.1 |
| 2017/0327695 A1* | 11/2017 | Senani | C09D 7/69 |
| 2020/0095465 A1 | 3/2020 | Suleiman et al. | |

FOREIGN PATENT DOCUMENTS

| | | |
|---|---|---|
| IN | 201711037003 | 4/2019 |
| JP | 2013518981 A | 5/2013 |
| JP | 2014528520 A | 10/2014 |
| JP | 2016121331 A | 7/2016 |
| JP | 6204565 B2 | 9/2017 |

(Continued)

OTHER PUBLICATIONS

Notification of Transmittal of International Preliminary Report on Patentability; Application No. PCT/US2022/042319; Mar. 14, 2024, 8 pages.

(Continued)

*Primary Examiner* — Joseph D Anthony
(74) *Attorney, Agent, or Firm* — CANTOR COLBURN LLP (57) ABSTRACT

A corrosion inhibiting coating includes a hybrid sol-gel polymer matrix formed from a mixture of organometallic compounds, an organoalkoxysilane, a metal complexing agent, and at least two corrosion inhibiting compounds or species.

14 Claims, 4 Drawing Sheets (56) References Cited

FOREIGN PATENT DOCUMENTS

| WO | 2013054064 A1 | 4/2013 |
| WO | 2014151533 A1 | 9/2014 |
| WO | 2015001461 A1 | 1/2015 |
| WO | 2018017175 A1 | 1/2018 |
| WO | 2020169775 A1 | 8/2020 |

OTHER PUBLICATIONS

JP Office Action with English Translation for Application No. 2024-513768, mailed Apr. 1, 2025, 11 pages.
JP Third Party Submission for Japanese Patent Application No. 2024-513768, mailed Apr. 30, 2025, 4 pages.
Notification of Transmittal of the International Search Report of the International Searching Authority, or the Declaration; PCT/US2022/042319; Dec. 7, 2022, 5 pages.
Notification of Transmittal of the International Written Opinion of the International Searching Authority, or the Declaration; PCT/US2022/042319; Dec. 7, 2022, 8 pages.
Cambon et al., "Effect of cerium concentration on corrosion resistance and polymerization of hybrid sol-gel coating on martensitic stainless steel", HAL, Jun. 13, 2013, 10 pages.
Mei et al., "Effects of cerium salts on corrosion behaviors of Si—Zr hybrid sol-gel coatings", Chinese Journal of Aeronautics, 2015, 28(2): pp. 600-608.

\* cited by examiner

FIG. 4

HYBRID SOL-GEL COATING FORMULATIONS DOPED WITH CORROSION INHIBITIVE PIGMENTS

CROSS-REFERENCE TO RELATED APPLICATIONS

This application which claims priority to U.S. Provisional Patent Application No. 63/239,494, filed Sep. 1, 2021, and U.S. Provisional Patent Application No. 63/239,485, filed Sep. 1, 2021, both of which are incorporated by reference herein in their entirety.

BACKGROUND

The present disclosure relates to sol-gel coatings, and more particularly, to hybrid sol-gel coatings doped with corrosion inhibitive species or pigments.

Corrosion damage is a challenge of environmentally exposed metals. Metallic corrosion is a coupled electrochemical reaction that includes anodic metal oxidation and cathodic oxidant reduction. Metallic materials corrode in a variety of gaseous and aqueous environments, such as wet air in the atmosphere. Metallic materials are particularly susceptible to corrosion due to galvanic coupling, i.e., when two materials of different electrochemical potential (e.g., dissimilar metals) are electrically connected in the presence of an electrolyte (e.g., water with dissolved salt).

Corrosion protection may take a variety of forms, including utilizing corrosion-resistant metal alloys, isolating dissimilar metals, applying chemical conversion coatings, plating metals, and applying coatings (e.g., paint, epoxy, polyurethane). While in use, additional moisture barriers, such as viscous lubricants and/or protectants, may be added to a corrodible surface. Conventional surface treatment for metals may use hexavalent chromium as the active corrosion-inhibiting ingredient.

Coating generally protects the underlying metal from corrosion by isolating the metal from the environment. If the integrity of the coating is compromised, for example, because the coating does not adhere well to the metal or because the coating is damaged (cracked, scratched, etc.), the underlying metal may be exposed to corrosive conditions. Complicating the threat of corrosion due to loss of coating integrity, coatings typically are opaque and mask the metal surface. Hence, corrosion that begins due to loss of coating integrity may be hidden and may progress unnoticed.

SUMMARY

According to embodiments, a corrosion inhibiting coating includes a hybrid sol-gel polymer matrix formed from a mixture of organometallic compounds, an organo-alkoxysilane, a metal complexing agent, and at least two corrosion inhibiting compounds or species.

According to other embodiments, a corrosion inhibiting coating with a hybrid sol-gel polymer matrix formed from a mixture of organometallics comprising zirconium (IV), aluminum, and titanium (IV) in molar ratios of about 1 to about 3:about 0.5 to about 2:about 0.25 to about 1, an organo-alkoxysilane, acetic acid, and at least two corrosion inhibiting compounds or species.

According to some embodiments, a method of making a corrosion inhibiting coating includes mixing organometallic compounds to form an organometallic mixture, mixing a metal complexing agent with the organometallic mixture, mixing the organometallic mixture and metal complexing agent with an organoalkoxysilane to form a hybrid polymer mixture, and mixing at least two corrosion inhibiting species or compounds into the hybrid polymer mixture.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As mentioned above, a surface treatment for metals includes chromium as the active corrosion-inhibiting ingredient. Traditionally, these treatments were based on hexavalent chromium (Cr (VI)), a known carcinogen that presents environmental challenges. The best performing alternative has been based on trivalent chromium (Cr (III)). While Cr (III) presents significantly lower health risks than its hexavalent counterparts, there is an ongoing regulatory push to drive down permissible heavy metal exposure limits for manufacturing and repair personnel.

Siloxane-based sol-gel derived coatings, as one of the promising alternatives, offer favorable physical barrier properties and adhesion of an organic coating to a metal substrate. However, the sol-gel coatings can provide only barrier protection against corrosion and often do not exhibit self-healing properties like hexavalent chromate conversion coatings.

Accordingly, described herein are sol-gel coating compositions and preparation processes for such coatings that include a hybrid organosilicon/metal oxide (e.g., zirconium (Zr), titanium (Ti), and aluminum (Al) in a particular ratio) coating composition, incorporated with a plurality of corrosion inhibitive pigments (or species). In some embodiments, the corrosion inhibitive pigments include two or more of cerium citrate, cerium acetate, magnesium silicate, zinc molybdate, aluminum orthophosphate, and lithium carbonate.

Adding more than one low-solubility corrosion inhibitive pigment to a hybrid sol-gel coating is challenging for a variety of reasons. For example, the pigments (for example, cerium and molybdenum-based compounds) can interfere with the hybrid sol-gel crosslinking and can react with one another, ultimately resulting in an inability to prevent corrosion. However, in the coatings described herein, the ratios of components, including metal ratios, organosilicon to metal ratios, and acid to metal ratios, combined with the plurality of pigments, provide a corrosion inhibiting hybrid sol-gel coating.

According to embodiments, a hybrid sol-gel coating formulation includes a hybrid polymer matrix, which is a reacted form of a composition that includes an organoalkoxysilane, organometallic compounds embedded in the hybrid polymer matrix and a complexing agent, and at least two corrosion inhibitive pigments or species.

Examples of organoalkoxysilanes include, but are not limited to, tetraethoxysilane, 3-glycidoxypropyltrimethoxysilane, or 3-aminopropyltriethoxysilane. According to one or more embodiments, the organoalkoxysilane is 3-glycidoxypropyltrimethoxysilane.

The organometallic compounds include metal alkoxides and metal complexes. Non-limiting examples of organometallic compounds include organo-zirconium, organo-zirconate, zirconium alkoxide, zirconium oxide, organo-titanium, titanium alkoxide, organo-aluminum, aluminum alkoxide.

According to one or more embodiments, the organometallic compounds are zirconium (IV) propoxide (i.e., tetrapropyl zirconate), aluminum-tri-sec-butoxide or aluminum isopropoxide, and titanium (IV) isopropoxide (i.e., tetraisopropyl orthotitanate). In other embodiments, the molar ratios of zirconium (IV) to aluminum to titanium (IV) (Zr:Al:Ti) in the formulation for the hybrid sol-gel coating are about 1 to about 3:about 0.5 to about 2:about 0.25 to about 1. In some embodiments, the molar ratios of Zr:Al:Ti are about 1 to about 1.5:about 0.5 to about 1.5:about 0.5 to about 1.0. In one or more embodiments, the molar ratios of Zr:Al:Ti are about 1.2:about 0.8:about 0.5.

The molar ratio of silicon from the organoalkoxysilane and metal from the organometallic, or the silicon to metal molar ratio is about 2 to about 5 in some embodiments. In other embodiments, the silicon to metal from the organometallic molar ratio is about 2.6 to about 3.0.

The solution mixture of the organoalkoxysiane and organometallic compounds before the reaction to form the sol-gel coating is called the sol solution and/or the sol. The sol solution is a colloidal solution of small particles including the metal oxide species. The hybrid sol-gels are formed by a solution-gelation condensation of one or more organic and inorganic metal species in solution. The metal species are hydrolyzed and condensed to form metal-oxide cross linkages and a gel network. Where the metal species include organic groups, the gel network is a hybrid organic/inorganic polymer. When used as a coating on a metal substrate, the metal moieties of the organometallic species may interact with, react with, adhere to, and/or bond to the metal substrate and/or a metal oxide layer on the metal substrate.

The sol solution may include a sol carrier solution in which the metal species are dissolved, suspended, emulsified, and/or dispersed. The sol carrier solution may be an aqueous solution, a polar organic solution, and/or a non-polar organic solution. For example, the sol carrier solution may include one or more of water, an alcohol, propanol, an ether, a glycol ether, dipropylene glycol dimethyl ether, and dimethyl ether. Additionally or alternatively, the sol solution may include several other components, including, for example, organic components, non-polar components, surfactants, emulsifiers, and/or pigments.

The sol-gel reaction is generally slow and, therefore, the sol solutions include hydrolysis catalysts to accelerate hydrolysis of the metal species and/or to stabilize the hydrolysis rate. Non-limiting examples of catalysts include acids and bases. According to one or more embodiments, the catalyst is a carboxylic acid catalyst, for example, acetic acid or succinic acid. The catalyst maintains an acidic pH of about 2 to about 3 in some embodiments.

Unlike conventional hybrid sol-gel catalysts, in some embodiments, the catalyst used herein has a dual function as both a catalyst to accelerate hydrolysis as well as a metal complexing agent. The catalyst functions as a complexing agent to complex and stabilize the metals from the organometallics, which would otherwise precipitate out of solution. Provided this dual function, the molar ratio of the catalyst/complexing agent plays an important role. According to one or more embodiments, the molar ratio of the catalyst/complexing agent to metal is about 4 to about 10. According to some embodiments, the molar ratio of the catalyst/complexing agent to metal is about 5 to about 8.

The component used as a complexing agent is the same component used as the catalyst in some embodiments, which is added in two separate steps. In other embodiments, the component used as the complexing agent is different than the component used as the catalyst. In some embodiments, acetic acid functions as both the complexing agent and the catalyst. In other embodiments, acetic acid is added as the complexing agent or as the catalyst, and a different acid or base is added as the complexing agent or catalyst so that the complexing agent and the catalyst are different.

The hybrid sol-gel coating formulation further includes at least two corrosion inhibitive species and/or compounds. The corrosion inhibitive compounds are added to the composition as nanoscale pigment particles or as individual species or components that are synthesized in-situ to form nanoscale pigment particles. The size of the pigment particles must be small enough and generally nanoscaled or they will precipitate out of solution. Non-limiting examples of corrosion inhibitive species include cerium (III), zinc (II), molybdate, silicate, phosphate, and lithium species. Non-limiting examples of corrosion inhibiting compounds include cerium citrate, cerium acetate, magnesium silicate, zinc acetate, zinc molybdate, aluminum orthophosphate, and lithium carbonate. In some embodiments, the corrosion inhibitive pigments are formed in-situ after individual components are added to the hybrid sol-gel composition. For example, cerium (III) salt and citric acid form cerium citrate in-situ. In another example, zinc (II) salt and molybdenum oxide ($MoO_3$) form zinc molybdenate ($ZnMoO_4$) in-situ.

In some embodiments, a hybrid sol-gel formulation includes a combination of two or more, three or more, four or more, or all of Ce (III), zinc (II), molybdate, silicate, phosphate and lithium species. In other embodiments, a hybrid sol-gel formulation includes a combination of two or more, three or more, four or more, or all of cerium-citrate, cerium-acetate, magnesium-silicate, zinc-molybdate, aluminum-orthophosphate, and lithium-carbonate.

The corrosion inhibitive pigment compounds are generally poorly soluble in water and aqueous solvents and may be dissolved in compatible solutions and/or solvents, and may be suspended, emulsified, and/or dispersed within compatible solutions and/or solvents. Suitable solutions and/or solvents for dissolving, suspending, emulsifying, and/or dispersing corrosion inhibiting compounds include, for example, one or more of polar solvents, nonpolar solvents, water, and surfactants.

According to one or more embodiments, the corrosion inhibiting species are added to the hybrid sol-gel composition dispersed in a mixture of surfactants and acrylic monomers. Non-limiting examples of surfactants include anionic surfactants, nonionic surfactants, cationic surfactants, amphoteric surfactants, or a combination thereof.

The corrosion resistance of the corrosion inhibiting coatings can be evaluated by various methods. In some embodiments, AC electrochemical impedance testing is used to evaluate the corrosion resistance, which measures the impedance (Ohms—square centimeters) as a function of frequency (Hz) in response to exposure. The larger the impedance, the better the barrier/corrosion resistance of the coating. According to some embodiments, the corrosion inhibiting coatings have an alternation current (AC) impedance of at least 5×10E+06 Ohms—square centimeter at a frequency of 0.01 Hz.

In other embodiments, DC anodic polarization is used to evaluate the corrosion resistance of the corrosion inhibiting coatings, which measures the potential (voltage (V) with reference to a saturated calomel electrode (SCE)) as a function of log current density (amperes per square centimeters ($Å/cm^2$). The smaller the corrosion current density, the greater the corrosion resistance. According to one or more embodiments, the corrosion inhibiting coatings have an open circuit potential of about −450 to about −600 mV/SCE and a current density of less than 1×10E-11 to 10E-12 $Å/cm^2$.

Figure 1:
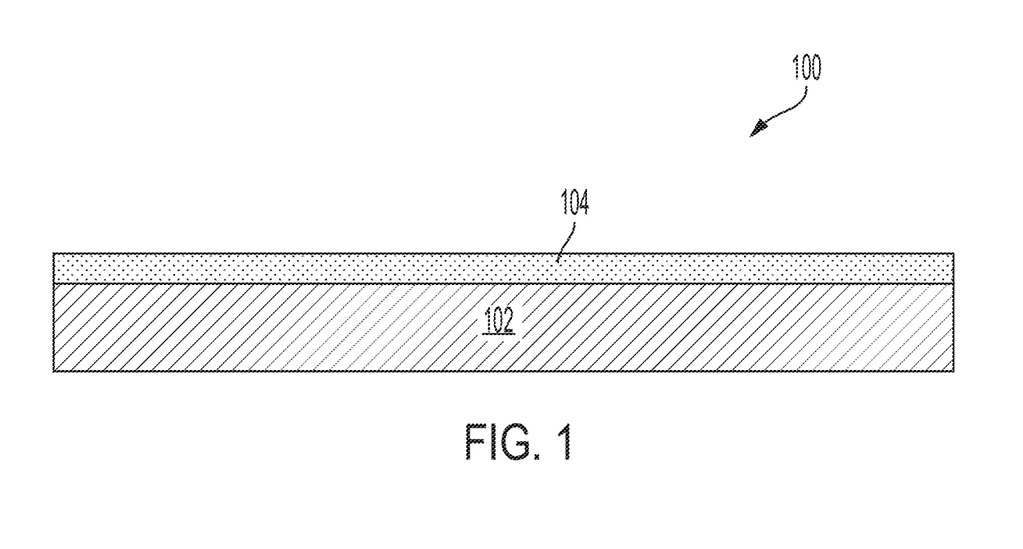
FIG. 1 is a cross-sectional side view of a corrosion inhibitive hybrid sol-gel coating on a substrate.

FIG. 1 is a cross-sectional side view of a coated substrate 100 that includes a corrosion inhibitive hybrid sol-gel coating 102 on a substrate 102. The corrosion inhibiting hybrid sol-gel coating 102 is coated, deposited, and/or cured on the surface of the substrate 102. A secondary layer of another coating may be deposited on top of the hybrid-sol gel coating 102.

The substrate 102 is a metal substrate. The substrate 102 is part of an aerospace structure in some embodiments. Non-limiting examples of metals for the metal substrate include aluminum, copper, magnesium, and alloys thereof. The aerospace structure is, but not limited to, an aircraft, a space shuttle, or a missile.

Figure 2:
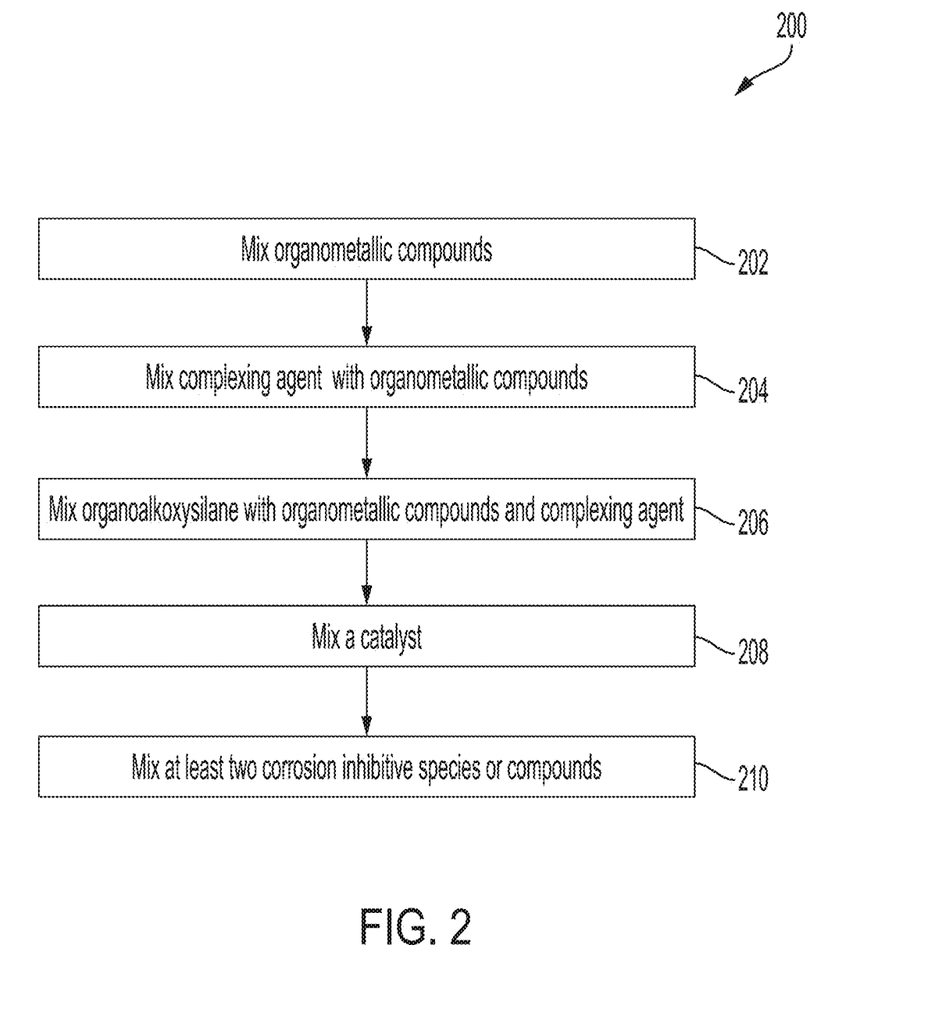
FIG. 2 is a flow diagram of a method for making a corrosion inhibitive hybrid sol-gel coating.

FIG. 2 is a flow diagram of a method 200 for making a corrosion inhibitive hybrid sol-gel coating. The hybrid sol-gel coating formulation includes a hybrid polymer matrix, which is a reacted form of a composition that includes an organoalkoxysilane, organometallic compounds embedded in the hybrid polymer matrix and a complexing agent, and at least two corrosion inhibitive pigments or species.

The method includes, as shown in box 202, mixing organometallic compounds. The organometallic compounds are mixed in a predetermined ratio and under strong stirring. According to some embodiments, a first organometallic compound is combined and stirred with a second organometallic compound to form a precursor mixture that includes the first and second organometallic compounds. Subsequently, a third organometallic compound is combined and stirred with the precursor mixture to provide a precursor mixture that includes first, second, and third organometallic compounds. In some embodiments, the first organometallic compound is a zirconium compound (e.g., zirconium (IV) propoxide), the second organometallic compound is an aluminum compound (e.g., aluminum-tri-sec-butoxide), and the third organometallic compound is a titanium compound (e.g., titanium (IV) isopropoxide).

The method includes, as shown in box 204, mixing a complexing agent with the organometallic compounds. The method includes, as shown in box 206, mixing an organoalkoxysilane with the organometallic compound and complexing agent at a pre-determined molar ratio of silicon to total metals. The hybrid sol-gels are formed by a solution-gelation condensation of one or more metal species in solution. The metal species are hydrolyzed and condensed to form metal-oxide cross linkages and a gel network. Where the metal species include organic groups, the gel network is a hybrid organic/inorganic polymer.

The method includes, as shown in box, 208, mixing a catalyst with the mixture of the organometallic compounds, organoalkoxysilane and complexing agent to accelerate the reaction. In some embodiments, the catalyst is the same as the complexing agent in box 204. In other embodiments, the catalyst is different than the complexing agent in box 204. Whether the same or different than the complexing agent, a total molar ratio of the combined catalyst and complexing agent to metal is about 4 to about 10.

The mixture with the organometallic compounds, organoalkoxysilane, complexing agent, and catalyst is sufficiently stirred before adding the corrosion inhibiting pigments. In one or more embodiments, the mixture with the organometallic particles, organoalkoxysilane, complexing agent, and catalyst is stirred for about 18 to about 30 hours, or about 22 to about 26 hours.

The method includes, as shown in box 210, adding at least two corrosion inhibitive species or compounds. The corrosion inhibitive compounds are added to the composition as nanoscale pigment particles or as individual species or components that are synthesized in-situ to form nanoscale pigment particles. The size of the pigment particles must be small enough and generally nanoscaled or they will precipitate out of solution.

EXAMPLES

Example 1. Corrosion Inhibiting Hybrid Sol-Gel Formulation

A hybrid sol-gel formulation includes the following composition shown in Table 1.

TABLE 1

| Hybrid sol-gel formulation with corrosion inhibiting nanopigments | | |
|---|---|---|
| | Component | Molar ratio |
| Organometallic(s) | Tetrapropyl zirconate; aluminum-tri-sec-butoxide or aluminum isopropoxide; and tetraisopropyl orthotitanate | Zr:Al:Ti 1.2:0.8:0.5 |
| Organoalkoxysilane | 3-Glycidyloxypropyl) trimethoxysilane | Si:Total Metal 2.6 to 3.0 |
| Catalyst and complexing agent | Acetic acid | Acetic acid: Total Metal 5-8 |
| Corrosion inhibiting pigments | Cerium-citrate, cerium-acetate, zinc-acetate, magnesium-silicate, zinc-molybdate, and aluminum-orthophosphate | each 0.1-1.0 g/100 ml sol |

Example 2. Corrosion Inhibiting Hybrid Sol-Gel Formulation

A hybrid sol-gel formulation includes the following composition shown in Table 2. The corrosion inhibiting species form corrosion inhibiting compounds in-situ.

TABLE 2

Hybrid sol-gel formulation with corrosion inhibiting species

| | Component | Molar ratio | | |
|---|---|---|---|---|
| Organo-metallics | Tetrapropyl zirconate; aluminum-tri-sec-butoxide or aluminum isopropoxide; and tetraisopropyl orthotitanate | Zr:Al:Ti 1.2:0.8:0.5 | | |
| Organoalk-oxysilane | 3-Glycidyl-oxypropyl) trimethoxysilane | Si:Metal (Zr, Al, Ti) 2.6 to 3.0 | | |
| Catalyst and complexing agent | Acetic acid | Acetic acid: Metal (Zr, Al, Ti) 5-8 | | |
| Corrosion inhibiting species | Cerium (III), zinc (II), molybdate, silicate, phosphate and lithium species | | high | low |
| | | Mo | 10 mM | 1 mM |
| | | Ce | | |
| | | Zn | 10 mM | 1 mM |
| | | P | 5 mM | 0.5 mM |
| | | Si | 5 mM | 0.5 mM |
| | | Li | 1 mM | 0.1 mM |

Figure 3:
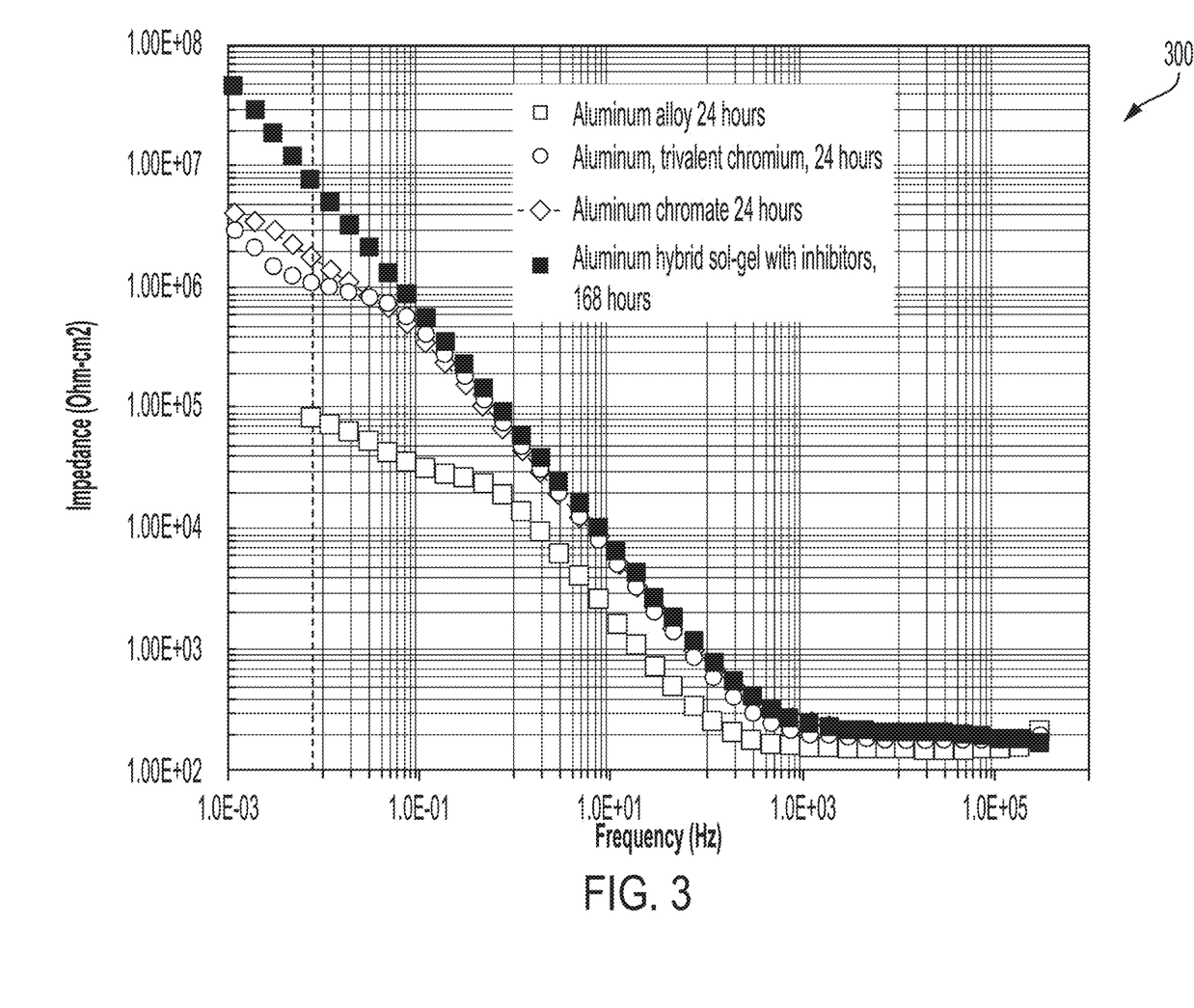
FIG. 3 is a graph demonstrating results of corrosion resistance testing for coatings according to alternating current (AC) impedance testing.

Example 3. Corrosion Resistance Testing by AC Electrochemical Impedance and ASTM B117 Salt Fog Exposure The corrosion resistance of the corrosion inhibiting coatings were evaluated by ASTM B117 testing, as well as AC electrochemical impedance, which evaluates the impedance (Ohm—square centimeters) as a function of frequency (Hz) in response to salt fog exposure. The larger the impedance, the better the barrier/corrosion resistance of the coating. FIG. 3 shows the results of AC electrochemical impedance testing of various coatings, which are also shown in Table 1 below, including the ASTM B117 168 hours results (i.e., pit numbers). The aluminum (Al) sample was Al 6061(Al—Si—Mg) and did not include a coating. The TCP-Al sample was a commercial trivalent chromium process coated (TCP). The aluminum chromate sample was a commercial chromated conversion coated (CCC). The aluminum hybrid sol-gel sample is a hybrid-sol-gel coated in accordance with the present disclosure, containing a multiple component mixture of cerium-citrate, magnesium silicate, and zinc molybdate.

TABLE 3

AC electrochemical impedance and ASTM B117 neutral salt fog testing results

| Sample | AC Impedance (Ohm-cm$^2$) at low Hz | Pits (per ASTM B117-168 hr) |
|---|---|---|
| Aluminum alloy | 8.35E+04 | Pits |
| Aluminum, trivalent chromium process | 1.06E+06 | 1 pit |
| Aluminum chromate | 1.72E+06 | No pits |
| Aluminum hybrid sol-gel with inhibitors | 7.37E+07 | No pits |

Example 4. Corrosion Resistance Testing by DC Anodic Polarization

DC anodic polarization was used to evaluate the corrosion resistance of the corrosion inhibiting coatings, which measures the potential (voltage (V) with reference to a saturated calomel electrode (SCE)) as a function of log current density (amperes per square centimeters (A/cm$^2$).

Figure 4:
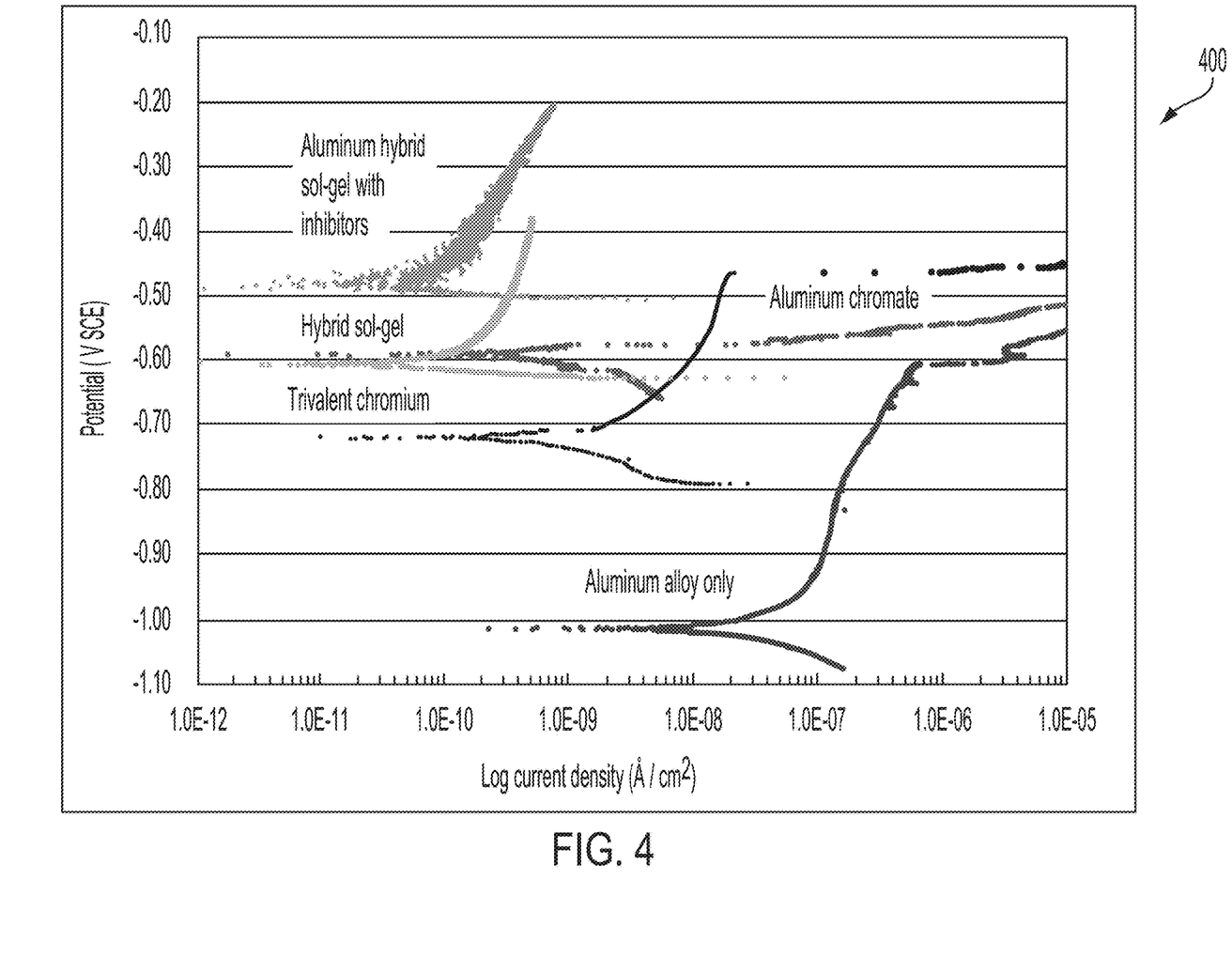
FIG. 4 is a graph demonstrating results of corrosion resistance testing for coatings by direct current (DC) anodic polarization.

FIG. 4 and Table 4 below show the results of DC anodic polarization testing of various coatings. The samples described in Example 1 were used, where the hybrid sol-gel coating contains no corrosion inhibitive pigments or species.

TABLE 4

DC anodic polarization testing results in 0.35% NaCl solutions

| Sample | Corrosion current density (A/cm$^2$) | Open circuit potential (mV SCE) | Pitting potential (mV SCE) |
|---|---|---|---|
| Aluminum alloy | ~1E−07 | ~−1000 | ~−600 |
| Aluminum, trivalent chromium process | ~4E−08 | ~−700 | ~−480 |
| Aluminum chromate | ~1.5E−09 | ~−550 | ~−530 |
| Hybrid sol-gel | ~1.5E−10 | ~−600 | >−400 |
| Aluminum hybrid sol-gel with inhibitors | ~4.5E−11 | ~−550 | >−200 |

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form detailed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the various embodiments with various modifications as are suited to the particular use contemplated.

While the preferred embodiments have been described, it will be understood that those skilled in the art, both now and in the future, may make various improvements and enhancements which fall within the scope of the claims which follow. These claims should be construed to maintain the proper protection for the disclosure as first described.

What is claimed is:

1. A corrosion inhibiting coating comprising:
   a hybrid sol-gel polymer matrix formed from a mixture comprising:
   organometallic compounds;
   an organoalkoxysilane;
   a metal complexing agent; and
   at least two additional corrosion inhibiting compounds or species;
   wherein the organometallic compounds include zirconium (IV) propoxide, aluminum-tri-sec-butoxide, and titanium (IV) isopropoxide.

2. The corrosion inhibiting coating of claim 1, wherein the organometallic compounds include organo-zirconium, organo-zirconate, zirconium alkoxide, zirconium oxide, organo-titanium, titanium alkoxide, titanium oxide, organo-aluminum, aluminum alkoxide, aluminum oxide, or a combination thereof.

3. The corrosion inhibiting coating of claim 1, wherein the organoalkoxysilane is tetraethoxysilane, 3-glycidoxypropyltrimethoxysilane, or 3-aminopropyltriethoxysilane.

4. The corrosion inhibiting coating of claim 1, wherein a molar ratio of silicon to metals in the organometallic compounds is about 2.6 to about 3.0.

5. The corrosion inhibiting coating of claim 1, wherein the metal complexing agent is an acid catalyst.

6. The corrosion inhibiting coating of claim 1, wherein the at least two additional corrosion inhibiting species are two or more of cerium (III), zinc (II), molybdate, silicate, phosphate, and lithium species.

7. The corrosion inhibiting coating of claim 1, wherein the at least additional two corrosion inhibiting compounds are two or more of cerium-citrate, cerium-acetate, magnesium-silicate, zinc-molybdate, aluminum-orthophosphate, and lithium carbonate.

8. A metal substrate that includes the corrosion inhibiting coating of claim 1 on a surface.

9. A corrosion inhibiting coating with a hybrid sol-gel polymer matrix comprising:
    organometallics comprising zirconium (IV), aluminum, and titanium (IV) in molar ratios of about 1 to about 3:about 0.5 to about 2:about 0.25 to about 1;
    an organoalkoxysilane;
    acetic acid; and
    at least two additional corrosion inhibiting compounds or species.

10. The corrosion inhibiting coating of claim 9, wherein the organoalkoxysilane is tetraethoxysilane, 3-glycidoxypropyltrimethoxysilane, or 3-aminopropyltriethoxysilane.

11. The corrosion inhibiting coating of claim 9, wherein a molar ratio of silicon to metals in the organometallic compounds is about 2.6 to about 3.0.

12. The corrosion inhibiting coating of claim 9, wherein the metal complexing agent is an acid catalyst.

13. The corrosion inhibiting coating of claim 9, wherein the at least two additional corrosion inhibiting species are two or more of cerium (III), zinc (II), molybdate, silicate, phosphate, and lithium species.

14. The corrosion inhibiting coating of claim 1, wherein the at least additional two corrosion inhibiting compounds are two or more of cerium-citrate, cerium-acetate, magnesium-silicate, zinc-molybdate, aluminum-orthophosphate, and lithium carbonate.

* * * * *